United States Patent
Morris et al.

(10) Patent No.: US 12,433,828 B2
(45) Date of Patent: Oct. 7, 2025

(54) ORGANIC SUNSCREEN COMPOSITION AND PROCESS FOR PROTECTING SKIN FROM PHOTODAMAGE AND AGING

(71) Applicant: L'OREAL, Paris (FR)

(72) Inventors: Stephanie Anne Ventura Morris, Montclair, NJ (US); Kristin Steeley, Branchburg, NJ (US); Jaimie Mecca, Long Hill Township, NJ (US)

(73) Assignee: L'OREAL, Paris (FR)

( * ) Notice: Subject to any disclaimer, the term of this patent is extended or adjusted under 35 U.S.C. 154(b) by 182 days.

(21) Appl. No.: 17/826,315

(22) Filed: May 27, 2022

(65) Prior Publication Data

US 2023/0381074 A1   Nov. 30, 2023

(51) Int. Cl.
| | |
|---|---|
| A61K 8/368 | (2006.01) |
| A61K 8/06 | (2006.01) |
| A61K 8/25 | (2006.01) |
| A61K 8/26 | (2006.01) |
| A61K 8/31 | (2006.01) |
| A61K 8/33 | (2006.01) |
| A61K 8/35 | (2006.01) |
| A61K 8/40 | (2006.01) |
| A61K 8/58 | (2006.01) |
| A61K 8/891 | (2006.01) |
| A61Q 17/04 | (2006.01) |

(52) U.S. Cl.
CPC .............. *A61K 8/368* (2013.01); *A61K 8/064* (2013.01); *A61K 8/25* (2013.01); *A61K 8/26* (2013.01); *A61K 8/31* (2013.01); *A61K 8/33* (2013.01); *A61K 8/35* (2013.01); *A61K 8/40* (2013.01); *A61K 8/585* (2013.01); *A61K 8/891* (2013.01); *A61Q 17/04* (2013.01); *A61K 2800/48* (2013.01)

(58) Field of Classification Search
None
See application file for complete search history.

(56) References Cited

U.S. PATENT DOCUMENTS

| | | | |
|---|---|---|---|
| 5,143,722 | A | 9/1992 | Hollenberg |
| 5,665,368 | A | 9/1997 | Lentini |
| 5,958,431 | A | 9/1999 | Brancq et al. |
| 2004/0258638 | A1 | 12/2004 | Wendel et al. |
| 2007/0292530 | A1 | 12/2007 | Dinno |
| 2008/0269352 | A1 | 10/2008 | Falkoswki et al. |
| 2009/0324506 | A1 | 12/2009 | Seidling |
| 2010/0183536 | A1 | 7/2010 | Ansmann et al. |
| 2012/0258055 | A1 | 10/2012 | Gray et al. |
| 2018/0116925 | A1 * | 5/2018 | Johnson ............... A61Q 17/04 |

FOREIGN PATENT DOCUMENTS

| | | | | |
|---|---|---|---|---|
| EP | 1174119 | A1 | 1/2002 | |
| FR | 3025094 | A1 * | 3/2016 | ............ A61K 8/042 |
| WO | 199206778 | A1 | 4/1992 | |
| WO | 2006013413 | A1 | 2/2006 | |
| WO | 2007068371 | A1 | 6/2007 | |
| WO | 2008155059 | A2 | 12/2008 | |

OTHER PUBLICATIONS

Search Report from corresponding application FR 2209415 mailed May 17, 2023, 6 pages.

* cited by examiner

*Primary Examiner* — Nannette Holloman
(74) *Attorney, Agent, or Firm* — Laetitia Leproust (57) ABSTRACT

The instant disclosure is directed to a composition and method for protecting a keratinous substrate from UV rays by applying onto the substrate a composition containing: (a) at least one oil phase thickening agent chosen from an activated clay; (b) at least one substantially solid form dispersing aid; (c) at least one organic sunscreen active; (d) at least one non-volatile solvent; (e) at least one volatile solvent; (f) at least one emulsifier; (g) at least one film former; and (h) water, wherein (a) and (b) are present in the composition in a ratio by weight ranging from greater than 1:10 to less than 1:4; and wherein (b) and (c) are present in the composition in a ratio by weight ranging from greater than 1:30 to less than 1:1.

20 Claims, 2 Drawing Sheets

ORGANIC SUNSCREEN COMPOSITION AND PROCESS FOR PROTECTING SKIN FROM PHOTODAMAGE AND AGING

FIELD OF THE DISCLOSURE

The instant disclosure is directed to a novel organic sunscreen composition and process for protecting skin from photodamage, the composition having exceptional skin-feel properties with highly efficacious spreadability and non-whitening application. More particularly, the disclosure is directed to an organic sunscreen composition containing activated clay combined with a dispersing aid/agent and one or more organic sunscreen active.

BACKGROUND OF THE DISCLOSURE

Aging skin is the result of more than just chronological age. Skin is exposed to various environmental stresses, such as UV rays, which cause free radicals to form in the skin. The degree of UV protection afforded by a composition is directly related to the amount and type of sunscreen actives present therein. The more sunscreen actives present, the greater the degree of UV protection. It is highly desirous for a sunscreen to offer a high degree of both UVA and UVB protection while being mild on the skin and cosmetically elegant.

It is an object of the instant disclosure to provide an organic sunscreen composition with high SPF properties that is stable, has a highly efficacious spreadability, water resistant and also provides an even distribution of sunscreen actives.

BRIEF SUMMARY OF THE DISCLOSURE

The instant disclosure relates to water-in-oil sunscreen compositions with organic sunscreen filters which provide a high degree of sun protection, water resistance, and even UV filter distribution. The compositions also provide a unique sensory experience as it is highly spreadable, soft, silky, low viscosity, non-greasy and non-whitening. The sunscreen compositions in the form of a water-in-oil emulsion typically include:
(a) at least one oil phase thickening agent chosen from an activated clay;
(b) at least one substantially solid form dispersing aid;
(c) at least one organic sunscreen active;
(d) at least one non-volatile solvent;
(e) at least one volatile solvent;
(f) at least one emulsifier;
(g) at least one film former; and
(h) water,
wherein (a) and (b) are present in the composition in a ratio by weight ranging from greater than 1:10 to less than 1:4; and
wherein (b) and (c) are present in the composition in a ratio by weight ranging from greater than 1:30 to less than 1:1.

In some embodiments, the at least one oil phase thickening agent is chosen from Disteardimonnium hectorite, Stearalkonium hectorite, Quat-18 bentonite, Quat-18 hectorite, Benzalkonium bentonite, bentonite clay, hectorite clay, and montmorillonite clay. In one embodiment, the at least one oil phase thickening agent is a disteardimonium hectorite clay dispersed in isododecane and modified by propylene carbonate. In some embodiments, the at least one oil phase thickening agent is present in an amount of from about 0.01% to about 7.5% by weight, based on the total weight of the composition. In some embodiments, the at least one oil phase thickening agent is present in an amount of from about 0.1% to about 1.25% by weight, based on the total weight of the composition.

In some embodiments, the at least one substantially solid form dispersing aid is chosen from silica, Silica and TiO2 sol/gel particles, starch, precipitated calcium carbonate, hydroxyapatite, montmorillonite, lauroyl lysine, mica, sericite, talc, polytetrafluoroethylene (PTFE wax), boron nitride, kaolin, calcium sulfate, pumice, bismuth oxychloride, titanium dioxide, aluminum oxide, silicon, perlite, oxychloride bismuth, barium sulfate, glass particles, zinc oxide, mica and TiO2 particles, barium sulfate, and synthetic mica. In one embodiment, the at least one substantially solid form dispersing aid is silica. In some embodiments, at least one substantially solid form dispersing aid is present in an amount of from about 0.1% to about 30% by weight, based on the total weight of the composition. In some embodiments, at least one substantially solid form dispersing aid is present in an amount of from about 1% to about 5% by weight, based on the total weight of the composition.

In some embodiments, the at least one organic sunscreen active is chosen from organic sunscreen actives and mixtures thereof. In some embodiments, the at least one organic sunscreen active is present in an amount of from about 10% to about 50% by weight, based on the total weight of the composition. In some embodiments, the at least one organic sunscreen active is present in an amount of from about 20% to about 40% by weight, based on the total weight of the composition.

In various embodiments, the at least one non-volatile solvent is chosen from a silicon oil functionalized or non-functionalized, a hydrocarbon oil and a mixtures thereof. In some embodiments, the at least one non-volatile solvent is chosen from Dicaprylyl Ether, C15-19 alkane and mixtures thereof. In some embodiments, the at least one non-volatile solvent is present in an amount of from about 1% to about 50% by weight, based on the total weight of the composition.

In some embodiments, the at least one volatile solvent is present in an amount of from about 0.001% to about 95% by weight, based on the total weight of the composition.

In some embodiments, the at least one emulsifier is present in an amount of from about 0.5% to about 15% by weight, based on the total weight of the composition.

In some embodiments, the at least one film former is chosen from acrylates/dimethicone crosspolymer, Trimethylsiloxysilicate (and) polypropylsilsesquioxane, Acrylates/Polytrimethylsiloxymethacrylate Copolymer, Dimethicone (and) Acrylates/dimethicone copolymer, Polypropylsilsesquioxane, Trimethylsiloxysilicate), Carnauba wax and a mixture thereof.

In some embodiments, the at least one film former is present in an amount from about 0.1% to about 5% by weight, based on the total weight of the composition.

In some embodiments, the composition may further include at least one tactile modifier. In some embodiments, the at least one tactile modifier is chosen from Polymethylsilsesquioxane, nylon-12, nylon-21, silica and mixtures thereof.

In some embodiments, the at least one oil phase thickening agent chosen from an activated clay and the at least one substantially solid form dispersing aid are present in the composition in a ratio by weight ranging from greater than or equal to 1:9 up to less than or equal to 1:5.

In some embodiments, the composition may further include at least one pigment.

In some embodiments, the instant disclosure is directed to a water-in-oil organic sunscreen composition comprising:
- (a) from about 0.1% to about 1.25% by weight of at least one oil phase thickening agent chosen from an activated clay selected from the group consisting of disteardimonium hectorite, stearalkonium hectorite, quaternium-18 bentonite, quaternium-18 hectorite, and benzalkonium bentonite;
- (b) from about 1% to about 5% by weight of at least one substantially solid form dispersing aid comprising silica;
- (c) from about 20% to about 40% by weight of at least one organic sunscreen active;
- (d) from about 5% to about 30% by weight of at least one non-volatile solvent;
- (e) from about 3% to about 10% by weight of at least one volatile solvent;
- (f) from about 1% to about 8% by weight of at least one emulsifier; and
- (g) water,
- (h) wherein the weights of (a)-(g) are based on the total weight of the composition; and
- (i) wherein (a) and (b) are present in the composition in a ratio by weight ranging from greater than 1:10 to less than 1:4; and
- (j) wherein (b) and (c) are present in the composition in a ratio by weight ranging from greater than 1:30 to less than 1:1.

The instant disclosure is also directed to a method for protecting a keratinous substrate from UV rays by topically applying onto the substrate a water-in-oil sunscreen composition containing:
- (a) at least one oil phase thickening agent chosen from an activated clay;
- (b) at least one substantially solid form dispersing aid;
- (c) at least one organic sunscreen active;
- (d) at least one non-volatile solvent;
- (e) at least one volatile solvent;
- (f) at least one emulsifier;
- (g) at least one film former; and
- (h) water,
- (i) wherein (a) and (b) are present in the composition in a ratio by weight ranging from greater than 1:10 to less than 1:4; and
- (j) wherein (b) and (c) are present in the composition in a ratio by weight ranging from greater than 1:30 to less than 1:1.

The water-in-oil sunscreen compositions of the instant disclosure provide unexpected high degree of sun protection, water resistance, and even UV filter distribution. The compositions also provide a unique sensory experience as it is highly spreadable, soft, silky, non-greasy and non-whitening.

Without being bound by theory or mechanism, it is suggested that the platelet clay structure is thought to entrap the sunscreen particles which prevents reagglomeration and settling. When applied, the yield point is surpassed and the clay structures open, allowing for an even spreading of US filters on skin.

It is to be understood that both the foregoing general description and the following detailed description are exemplary and explanatory only, and are not restrictive of the invention.

BRIEF DESCRIPTION OF THE DRAWINGS

Implementations of the present technology will now be described, by way of example only, with reference to the attached figures, wherein.

It should be understood that the various aspects are not limited to the arrangements and instrumentality shown in the figures.

DETAILED DESCRIPTION

The instant disclosure relates to water-in-oil sunscreen compositions comprising:
- (a) at least one oil phase thickening agent chosen from an activated clay;
- (b) at least one substantially solid form dispersing aid;
- (c) at least one organic sunscreen active;
- (d) at least one non-volatile solvent;
- (e) at least one volatile solvent;
- (f) at least one emulsifier;
- (g) at least one film former; and
- (h) water,
wherein (a) and (b) are present in the composition in a ratio by weight ranging from greater than 1:10 to less than 1:4; and
wherein (b) and (c) are present in the composition in a ratio by weight ranging from greater than 1:30 to less than 1:1.

The water-in-oil sunscreen compositions simultaneously provide a high degree of sun protection, water resistant and even UV filter distribution. The compositions also provide a unique sensory experience as it is highly spreadable, soft, silky, non-greasy and non-whitening.

Activated Clay

The composition contains at least one oil phase thickening agent chosen from activated clay. The clay is preferably an organoclay dispersed in oil with an organic solvent, and an organic activator (polar swelling agent).

Organoclays generally include those which are the reaction products of bentonite clays and quaternium ammonium salts, hectorite clays and quaternium ammonium salts, or montmorillonite clays and quaternium ammonium salts. The organoclay may be selected from the group consisting of disteardimonium hectorite, stearalkonium hectorite, quaternium-18 bentonite, quaternium-18 hectorite, and benzalkonium bentonite.

Suitable organic activators include, but are not limited to, lower monohydric alcohols such as ethanol and isopropyl alcohol; polar esters such as propylene carbonate; water; and the like.

Suitable organic solvents include, but are not limited to, natural oils, such as castor oil and lanolin oil; hydrocarbons, such as mineral oil, petroleum distillates, and isododecane; esters, such as isopropyl palmitate, isopropyl myristate and C12-C15 alkyl benzoate; diesters, such as propylene glycol dicaprylate; volatile silicones such as cyclomethicone; polymeric silicones such as dimethicone; and the like.

The organoclay component may be prepared by combining an organoclay, a nonpolar carrier and a polar swelling agent in a homogenizer-type mixer. Alternatively, commercial preparations comprising organoclays, nonpolar carriers, and polar swelling agents may be used. Preferably, a bentonite clay, hectorite clay, and montmorillonite clay is chosen for use in the composition. Most preferably the clay is a disteardimonium hectorite and propylene carbonate, or a gel formed by way of a dispersion of fully activated disteardimonium hectorite, a non-animal origin hectorite organoclay, in isododecane and propylene carbonate, such as those commercially available under the trade name Bentone Gel® (Elementis Specialties, Inc., Hightstown, N.J.).

The activated clay is generally present in the composition of the instant disclosure in an amount ranging from about 0.01% to about 7.5% by weight, such as from about 0.05% to about 2.5% by weight; such as from about 0.1% to about 1.25% by weight, based on the total weight of the composition.

Substantially Solid Form Dispersing Aid

The composition also contains at least one substantially solid form dispersing aid. The dispersing aid may be mineral or organic, and lamellar, platelet-shaped or flake.

Dispersing agents generally include talc, mica, barium sulfate, kaolin, lauroyllysine, starch, boron nitride, precipitated calcium carbonate, magnesium carbonate, magnesium hydrogen carbonate, hydroxyapatite, montmorillonite (for example Gel White H from Rookwood Additives), polytetrafluoroethylene (PTFE) wax particles (for instance Ceridust 9205 F from Clariant, or Fluoropure 103 C from Shamrock Technologies), calcium sulfate (for instance Prestia PR306 from Lafarge Prestia), pumice powder (for instance O-D decontaminated pumice from Eyraud), bismuth oxychloride, bismuth oxychloride, perlite (for instance Optima 1430 OR from World Minerals), glass particles especially about 10 microns in size and about 0.4 micron thick, for instance those sold under the references MTD010FYX(6001) or MTD010FYX(6009) by Nippon Sheet Glass, about 25 microns in size and about 0.4 micron thick, for instance those sold under the references MTD025FYX(6002) or MTD025FYX(6010) by Nippon Sheet Glass, silica and titanium dioxide sol/gel particles (for instance NLT30H2WA from Nippon Sheet Glass), mica and titanium dioxide particles, for instance Blancsealer from Merck.

The dispersing aid is preferably chosen from lauroyl lysine, mica, sericite, talc, polytetrafluoroethylene (PTFE), boron nitride, kaolin, oxychloride bismuth, aluminum oxide, silicon, perlite, oxychloride bismuth, barium sulfate, glass particles, zincoxide, mica-barium sulfate, and synthetic mica, silica.

Most preferably the dispersing aid is silica

It should be noted that the substantially solid form dispersing aid is preferably platelet-like in form so as to facilitate the inhibition of agglomeration between the organic sunscreen actives present in the composition.

The substantially solid form dispersing aid is generally present in the composition of the instant disclosure in an amount ranging from about 0.1% to about 30% by weight; such as from about 0.5% to about 10% by weight; such as from about 1% to about 5% by weight, based on the total weight of the composition.

Further, it has been particularly found that the activated clay to solid form dispersing agent (particularly silica) is to be utilized in a ratio by weight ranging from greater than about 1:4 up to less than about 1:10, including at ratios of 1:5, 1:6, 1:7, 1:8, 1:9 and less than 1:10. Preferably, the ratio is greater than or equal to 1:5 up to less than or equal to about 1:9.

UV Filters

UV filters are well known in the art for their use in stopping UV radiation. For example, the UV filter may be one or more organic UV filters and/or one or more inorganic UV filters. Non-limiting examples of UV filters include:

i. Sparingly soluble UV filters (not appreciably soluble in either water or oil) such as Methylene Bis-Benzotriazolyl Tetramethylbutylphenol, Tris-Biphenyl Triazine, Methanone, 1,1'-(1,4-piperazinediyl)bis[1-[2-[4-(diethylamino)-2-hydroxybenzoyl]phen-yl]—and mixtures thereof ii. Oil soluble organic UV filters (at least partially soluble in oil or organic solvent), such as Bis-Ethylhexyloxyphenol Methoxyphenyl Triazine, Butyl Methoxydibenzoylmethane (BMBM), Oxybenzone, Sulisobenzone, Diethylhexyl Butamido Triazone (DBT), Drometrizole Trisiloxane, Ethylhexyl Methoxycinnamate (EHMC), Ethylhexyl Salicylate (EHS), Ethylhexyl Triazone (EHT), Homosalate, Isoamyl p-Methoxycinnamate, 4-Methylbenzylidene Camphor, Octocrylene (OCR), Polysilicone-15, and Diethylamino Hydroxy Benzoyl Hexyl Benzoate (DHHB);

iii. Inorganic UV filters such as titanium oxide and zinc oxide, iron oxide, zirconium oxide and cerium oxide; and iv. Water soluble UV filters such as Phenylbenzimidazole Sulfonic Acid (PBSA), Sulisobenzone-sodium salt, Benzydilene Camphor Sulfonic Acid, Camphor Benzalkonium Methosulfate, Cinoxate, Disodium Phenyl Dibenzylmidazole Tetrasulfonate, Terephthalylidene Dicamphor Sulfonic Acid, PABA, and PEG-25 PABA.

In some instances, the UV filter is one or more of: a para-aminobenzoic acid derivative, a salicylic derivative, a cinnamic derivative, a benzophenone or an aminobenzophenone, an anthranillic derivative, a 0,0-diphenylacrylate derivative, a benzylidenecamphor derivative, a phenylbenzimidazole derivative, a benzotriazole derivative, a triazine derivative, a bisresorcinyl triazine, an imidazoline derivative, a benzalmalonate derivative, a 4,4-diarylbutadiene derivative, a benzoxazole derivative, a merocyanine, malonitrile or a malonate diphenyl butadiene derivative, a chalcone, or a mixture thereof.

Suitable UV filters can include broad-spectrum UV filters that protect against both UVA and UVB radiation, or UV filters that protect against UVA or UVB radiation. In some instances, the one or more UV filters may be methylene bis-benzotriazolyl tetramethylphenol, diethylamino hydroxybenzoyl hexyl benzoate, coated or uncoated zinc oxide, ethylhexyl methoxycinnamate, isoamyl methoxycinnamate, homosalate ethyl hexyl salicilate, octocrylene, polysilicone-15, butyl methoxydibenzoylmethane, menthyl anthranilate, and ethylhexyl dimethyl PABA.

The organic sunscreen active is generally present in the composition of the instant disclosure in an amount ranging from about 10% to about 50% by weight; such as from about 15% to about 45% by weight; such as from about 20% to about 40% by weight, based on the total weight of the composition.

In order to achieve maximum sunscreen efficacy, preferably substantially solid form dispersing aid and organic sunscreen active are employed in a ratio by weight ranging from about 1:30 to 1:1, preferably from about 1:25 to 1:3, and most preferably from about 1:20 to 1:5

Non-Volatile Solvent

The composition also contains at least one non-volatile solvent. The non-volatile solvent is preferably chosen from silicone oils, both functionalised and non-functionalised, hydrocarbon oils and mixtures thereof.

It is also pointed out that, for the purposes of the disclosure, the term "non-volatile" generally means a solvent that remains on the keratin substrate at room temperature and atmospheric pressure at least for several hours.

Examples of suitable non-volatile solvents include, but are not limited to, polar oils and non-polar oils such as:

hydrocarbon-based plant oils with a high triglyceride content consisting of fatty acid esters of glycerol, the fatty acids of which may have varied chain lengths, these chains possibly being linear or branched, and saturated or unsaturated; these oils are especially wheat germ oil, corn oil, sunflower oil, karite butter, castor oil, sweet almond oil, macadamia oil, apricot oil, soybean oil, rapeseed oil, cottonseed oil, alfalfa oil, poppy oil, pumpkin oil, sesame seed oil, marrow oil, avocado oil, hazelnut oil, grape seed oil, blackcurrant seed oil, evening primrose oil, millet oil, barley oil, quinoa oil, olive oil, rye oil, safflower oil, candlenut oil, passion flower oil or musk rose oil; or caprylic/capric acid triglycerides, for instance those sold by the company Stearineries Dubois or those sold under the names Miglyol 810, 812 and 818 by the company Dynamit Nobel;

synthetic oils or esters of formula $R_5COOR_6$ in which $R_5$ represents a linear or branched higher fatty acid residue containing from 1 to 40 carbon atoms, including from 7 to 19 carbon atoms, and $R_6$ represents a branched hydrocarbon-based chain containing from 1 to 40 carbon atoms, including from 3 to 20 carbon atoms, and also including, for example, octyldodecyl neopentanoate, Purcellin oil (cetostearyl octanoate), isononyl isononanoate, $C_{12}$ to $C_{15}$ alkyl benzoate, isopropyl myristate, 2-ethylhexyl palmitate, and octanoates, decanoates or ricinoleates of alcohols or of polyalcohols; hydroxylated esters, for instance isostearyl lactate or diisostearyl malate; and pentaerythritol esters;

synthetic ethers containing from 10 to 40 carbon atoms; $C_8$ to $C_{26}$ fatty alcohols, for instance oleyl alcohol; and mixtures thereof.

Further, examples of non-volatile oils that may be used in the instant disclosure include, but are not limited to, non-polar oils such as branched and unbranched hydrocarbons and hydrocarbon waxes including polyolefins, in particular Vaseline (petrolatum), paraffin oil, squalane, squalene, hydrogenated polyisobutene, hydrogenated polydecene, polybutene, mineral oil, pentahydrosqualene, and mixtures thereof.

Examples of non-volatile solvents also include non-volatile silicones such as dimethicone fluids having viscosity values of equal to or greater than 300 cst.

Suitable non-volatile silicone oils that may be used include, but are not limited to, linear polydimethylsiloxanes (PDMSs), that are liquid at room temperature; polydimethylsiloxanes comprising alkyl, alkoxy or phenyl groups, which are pendent and/or at the end of a silicone chain, these groups each containing from 2 to 24 carbon atoms; phenylsilicones, for instance phenyl trimethicones, phenyl dimethicones, phenyl trimethylsiloxydiphenylsiloxanes, diphenyl dimethicones, diphenyl methyldiphenyl trisiloxanes, 2-phenylethyl trimethylsiloxysilicates, trimethyl pentaphenyl trisiloxane, tetramethyl hexaphenyl trisiloxane.

The non-volatile solvent is generally present in the composition of the instant disclosure in an amount ranging from about 1% to about 50% by weight; such as from about 3% to about 40% by weight; such as from about 5% to about 30% by weight, based on the total weight of the composition.

Volatile Solvent

The composition also contains at least one volatile solvent.

The expression "volatile solvent" means any non-aqueous medium capable of evaporating on contact with the skin or the lips in less than one hour at room temperature and atmospheric pressure.

Examples of suitable volatile solvents include, but are not limited to, volatile hydrocarbon-based oils such as, for example, volatile hydrocarbon oils having from 8 to 16 carbon atoms and their mixtures and in particular branched $C_8$ to $C_{16}$ alkanes such as $C_8$ to $C_{16}$ isoalkanes (also known as isoparaffins), isododecane, isodecane, isohexadecane, and for example, the oils sold under the trade names of Isopar or Permethyl, the $C_8$ to $C_{16}$ branched esters such as isohexyl or isodecyl neopentanoate, alcohols, and their mixtures. Preferably, the volatile hydrocarbon-based oils have a flash point of at least 40° C.

Examples of volatile hydrocarbon-based oils include, but are not limited to those given in Table 1 below.

TABLE 1

| Compound | Flash Point (° C.) |
| --- | --- |
| Isododecane | 43 |
| Isohexadecane | 102 |
| Isodecyl neopentanoate | 118 |
| Propylene glycol n-butyl ether | 60 |
| Ethyl 3-ethoxypropionate | 58 |
| Propylene glycol methylether acetate | 46 |
| Isopar L (isoparaffin $C_{11}$-$C_{13}$) | 62 |
| Isopar H (isoparaffin $C_{11}$-$C_{12}$) | 56 |

The volatile solvent may also be chosen from volatile silicone oils, which may be linear or cyclic, having a viscosity, at room temperature, of less than or equal to 6 cSt, and having from 2 to 7 silicon atoms, optionally substituted with alkyl or alkoxy groups of 1 to 10 carbon atoms.

Examples of suitable volatile silicone oils include, but are not limited to, those listed in Table 2 below.

TABLE 2

| Compound | Flash Point (° C.) | Viscosity (cSt) |
| --- | --- | --- |
| Octyltrimethicone | 93 | 1.2 |
| Hexyltrimethicone | 79 | 1.2 |
| Decamethylcyclopentasiloxane (cyclopentasiloxane or D5) | 72 | 4.2 |
| Octamethylcyclotetrasiloxane (cyclotetradimethylsiloxane or D4) | 55 | 2.5 |
| Dodecamethylcyclohexasiloxane (D6) | 93 | 7 |
| Decamethyltetrasiloxane(L4) | 63 | 1.7 |
| KF-96 A from Shin Etsu | 94 | 6 |
| PDMS (polydimethylsiloxane) DC 200 (1.5 cSt) from Dow Corning | 56 | 1.5 |
| PDMS DC 200 (2 cSt) from Dow Corning | 87 | 2 |
| PDMS DC 200 (5 cSt) from Dow Corning | 134 | 5 |
| PDMS DC 200 (3 St) from Dow Corning | 102 | 3 |

Further examples of volatile silicone oils which may be incorporated into cosmetic compositions according to the disclosure include cyclic volatile silicones. Preferably, the cyclic volatile silicone is cyclopentasiloxane or cyclohexasiloxane. Examples of commercially available volatile silicone oils include the following cyclomethicones: Dow Corning 200, Dow Corning 244, Dow Corning 245, Dow Corning 344, and Dow Corning 345 (commercially available from Dow Corning Corp.); SF-1204 and SF-1202 Silicone Fluids (commercially available from G. E. Silicones), GE 7207 and 7158 (commercially available from General Electric Co.); and SWS-03314 (commercially available from SWS Silicones Corp.). Other examples of commercially available methyl silsesquioxanes available as TMF 1.5 fluid from Shin-Etsu Chemical Co; SILCARE SILICONES, for example phenyl substituted silsesquioxanes available as Silcare 15M60, n-Octyl substituted silsesquioxanes available as Silcare 31M60 and 31M50, hexyl methicone, caprylyl methicone and lauryl methicone available as Silcare 41M10, 41M15 and 41M20 respectively from Clariant.

Other suitable solvents include, but are not limited to, organic solvents which are liquid at ambient temperature. Examples of suitable volatile solvents include, but are not limited to, ketones such as methyl ethyl ketone, methyl isobutyl ketone, diisobutyl ketone, isophorone, cyclohexanone or acetone; alcohols, such as ethanol, isopropanol, diacetone alcohol, 2-butoxyethanol or cyclohexanol; glycols, such as ethylene glycol, propylene glycol, pentylene glycol or glycerol; propylene glycol ethers, such as propylene glycol monomethyl ether, propylene glycol monomethyl ether acetate or dipropylene glycol mono(n-butyl) ether; short-chain esters (having a total of 2 to 7 carbon atoms), such as ethyl acetate, methyl acetate, propyl acetate, n-butyl acetate or isopentyl acetate; alkanes, such as decane, heptane, dodecane or cyclohexane; aldehydes, such as benzaldehyde or acetaldehyde; and their mixtures. Most preferred are short-chain esters (having a total of from 2 to 8 carbon atoms).

The volatile solvent may also be chosen from linear or branched hydrocarbons of mineral or synthetic origin, and derivatives thereof, such as liquid petroleum jelly and hydrogenated polyisobutene such as Parléam® oil; $C_8$-$C_{16}$ branched alkanes or isoalkanes (also known as isoparaffins), isododecane, isodecane and isohexadecane, such as for example the isoparaffins sold under the trade names Isopar by Exxon Chemical or the oils sold under the trade names Permethyl by Presperse; and mixtures thereof, volatile linear alkanes comprising from 7 to 17 carbon atoms such as undecane and tridecane.

A volatile linear alkane suitable for the disclosure is liquid at ambient temperature (around 25° C.) and at atmospheric pressure (760 mmHg).

The expression "volatile linear alkane", suitable for the disclosure, is understood to mean a cosmetic linear alkane capable of evaporating on contact with the skin in less than one hour, at ambient temperature (25° C.) and atmospheric pressure (760 mmHg, that is to say 101 325 Pa), that is liquid at ambient temperature, and that has, in particular, an evaporation rate ranging from 0.01 to 15 mg/cm$^2$/min at ambient temperature (25° C.) and atmospheric pressure (760 mmHg).

Preferably, the "volatile linear alkanes" suitable for the disclosure have an evaporation rate ranging from 0.01 to 3.5 mg/cm$^2$/min at ambient temperature (25° C.) and atmospheric pressure (760 mmHg).

Preferably, the "volatile linear alkanes" suitable for the disclosure have an evaporation rate ranging from 0.01 to 1.5 mg/cm$^2$/min at ambient temperature (25° C.) and atmospheric pressure (760 mmHg).

More preferably, the "volatile linear alkanes" suitable for the disclosure have an evaporation rate ranging from 0.01 to 0.8 mg/cm$^2$/min at ambient temperature (25° C.) and atmospheric pressure (760 mmHg).

More preferably, the "volatile linear alkanes" suitable for the disclosure have an evaporation rate ranging from 0.01 to 0.3 mg/cm$^2$/min at ambient temperature (25° C.) and atmospheric pressure (760 mmHg).

More preferably, the "volatile linear alkanes" suitable for the disclosure have an evaporation rate ranging from 0.01 to 0.12 mg/cm$^2$/min at ambient temperature (25° C.) and atmospheric pressure (760 mmHg).

The evaporation rate of a volatile alkane according to the disclosure (and more generally of a volatile solvent) may especially be evaluated by means of the protocol described in WO 06/013413, and more particularly by means of the protocol described below.

Introduced into a crystallizing dish (diameter: 7 cm), placed on a balance that is located in a chamber of around 0.3 m$^3$, the temperature (25° C.) and hygrometry (50% relative humidity) of which are regulated, are 15 g of volatile hydrocarbon-based solvent.

The liquid is left to evaporate freely, without being stirred, ventilation being provided by a fan (PAPST-MOTOREN, reference 8550 N, rotating at 2700 rpm) placed in a vertical position above the crystallizing dish containing the volatile hydrocarbon-based solvent, the blades being directed towards the crystallizing dish, at a distance of 20 cm relative to the base of the crystallizing dish.

The mass of volatile hydrocarbon-based solvent remaining in the crystallizing dish is measured at regular time intervals.

The evaporation profile of the solvent is then obtained by plotting the curve of the amounts of product evaporated (in mg/cm$^2$) as a function of the time (in min).

Then the evaporation rate, which corresponds to the tangent at the origin of the curve obtained, is calculated. The evaporation rates are expressed as mg of volatile solvent evaporated per unit area (cm$^2$) and per unit time (minutes).

According to one preferred embodiment, the "volatile linear alkanes" suitable for the disclosure have a non-zero vapour pressure (also known as saturation vapour pressure) at ambient temperature, in particular a vapour pressure ranging from 0.3 Pa to 6000 Pa.

Preferably, the "volatile linear alkanes" suitable for the disclosure have a vapour pressure ranging from 0.3 to 2000 Pa at ambient temperature (25° C.).

Preferably, the "volatile linear alkanes" suitable for the disclosure have a vapour pressure ranging from 0.3 to 1000 Pa at ambient temperature (25° C.).

More preferably, the "volatile linear alkanes" suitable for the disclosure have a vapour pressure ranging from 0.4 to 600 Pa at ambient temperature (25° C.).

Preferably, the "volatile linear alkanes" suitable for the disclosure have a vapour pressure ranging from 1 to 200 Pa at ambient temperature (25° C.).

More preferably, the "volatile linear alkanes" suitable for the disclosure have a vapour pressure ranging from 3 to 60 Pa at ambient temperature (25° C.).

According to one embodiment, a linear volatile alkane suitable for the disclosure may have a flashpoint in the range that varies from 30 to 120° C., and more particularly from 40 to 100° C. The flashpoint is, in particular, measured according to the ISO 3679 standard.

The volatile linear alkanes comprise from 7 to 17 carbon atoms, in particular from 7 to 15 carbon atoms, better still from 9 to 15 carbon atoms, and more particularly from 11 to 13 carbon atoms.

The volatile linear alkanes in accordance with the disclosure may advantageously be of plant origin.

According to one embodiment, an alkane suitable for the disclosure may be a volatile linear alkane comprising from 7 to 14 carbon atoms.

Preferably, the "volatile linear alkanes" suitable for the disclosure comprise from 8 to 14 carbon atoms.

Preferably, the "volatile linear alkanes" suitable for the disclosure comprise from 9 to 14 carbon atoms.

Preferably, the "volatile linear alkanes" suitable for the disclosure comprise from 10 to 14 carbon atoms.

Preferably, the "volatile linear alkanes" suitable for the disclosure comprise from 11 to 14 carbon atoms.

According to one advantageous embodiment, the "volatile linear alkanes" suitable for the disclosure have an evaporation rate, as defined above, ranging from 0.01 to 3.5 mg/cm$^2$/min at ambient temperature (25° C.) and atmospheric pressure (760 mmHg) and comprise from 8 to 14 carbon atoms.

A volatile linear alkane suitable for the disclosure may advantageously be of plant origin.

Preferably, the volatile linear alkane or the mixture of volatile linear alkanes present in the composition according to the disclosure comprises at least one $^{14}$C isotope of carbon (carbon-14), in particular the $^{14}$C isotope may be present in a $^{14}$C/$^{12}$C ratio greater than or equal to $1\times10^{-16}$, preferably greater than or equal to $1\times10^{-15}$, more preferably greater than or equal to $7.5\times10^{-14}$, and better still greater than or equal to $1.5\times10^{-13}$. Preferably, the $^{14}$C/$^{12}$C ratio ranges from $6\times10^{-13}$ to $1.2\times10^{-12}$.

The amount of $^{14}$C isotopes in the volatile linear alkane or the mixture of volatile linear alkanes may be determined by methods known to a person skilled in the art such as the Libby counting method, liquid scintillation spectrometry or else accelerator mass spectrometry.

Such alkanes may be obtained, directly or in several steps, from a plant raw material such as an oil, a butter, a wax, etc.

As examples of volatile linear alkanes suitable for the disclosure, mention may be made of those described in patent application WO 2007/068371 or WO 2008/155059 by Cognis (mixtures of different alkanes that differ by at least one carbon).

These alkanes are obtained from fatty alcohols that are themselves obtained from coconut oil or palm oil.

By way of example of a volatile linear alkane suitable for the disclosure, mention may be made of n-heptane (C7), n-octane (C8), n-nonane (C$_9$), n-decane (C$_{10}$), n-undecane (C$_{11}$), n-dodecane (C$_{12}$), n-tridecane (C$_{13}$), n-tetradecane (C$_{14}$), n-pentadecane (C$_{15}$), n-hexadecane (C$_{16}$) and n-heptadecane (C$_{17}$) and mixtures thereof.

According to one particular embodiment, the volatile linear alkane is chosen from n-nonane, n-undecane, n-dodecane, n-tridecane, n-tetradecane, and mixtures thereof.

According to one preferred mode, mention may be made of the mixtures of n-undecane (C$_{11}$) and of n-tridecane (C$_{13}$) obtained in examples 1 and 2 of application WO 2008/155059 by Cognis.

Mention may also be made of n-dodecane (C$_{12}$) and n-tetradecane (C$_{14}$) sold by Sasol respectively under the references PARAFOL 12-97 and PARAFOL 14-97, and also mixtures thereof.

The volatile linear alkane could be used alone.

Alternatively or preferably a mixture of at least two different volatile linear alkanes could be used, that differ from one another by a carbon number n of at least 1, in particular that differ from one another by a carbon number of 1 or 2.

According to a first embodiment, use is made of a mixture of at least two different volatile linear alkanes comprising from 10 to 14 carbon atoms that differ from one another by a carbon number of at least 1. By way of examples, mention may especially be made of the C$_{10}$/C$_{11}$, C$_{11}$/C$_{12}$ or C$_{12}$/C$_{13}$ mixtures of volatile linear alkanes.

According to another embodiment, use is made of a mixture of at least two different volatile linear alkanes comprising from 10 to 14 carbon atoms that differ from one another by a carbon number of at least 2. By way of examples, mention may especially be made of the C$_{10}$/C$_{12}$ or C$_{12}$/C$_{14}$ mixtures of volatile linear alkanes, for an even carbon number n and the C$_{11}$/C$_{13}$ mixture for an odd carbon number n.

According to one preferred mode, use is made of a mixture of at least two different volatile linear alkanes comprising from 10 to 14 carbon atoms that differ from one another by a carbon number of at least 2, and in particular a C$_{11}$/C$_{13}$ mixture of volatile linear alkanes or a C$_{12}$/C$_{14}$ mixture of the volatile linear alkanes.

Other mixtures combining more than 2 volatile linear alkanes according to the disclosure, such as for example a mixture of at least 3 different volatile linear alkanes comprising from 7 to 14 carbon atoms that differ from one another by a carbon number of at least 1, are also part of the disclosure, but the mixtures with 2 volatile linear alkanes according to the disclosure are preferred (binary mixtures), said 2 volatile linear alkanes preferably representing more than 95% and better still more than 99% by weight of the total content of volatile linear alkanes in the mixture. According to one particular mode of the disclosure, in a mixture of volatile linear alkanes, the volatile linear alkane having the smallest carbon number is predominant in the mixture.

According to another mode of the disclosure, use is made of a mixture of volatile linear alkanes in which the volatile linear alkane having the highest carbon number is predominant in the mixture.

By way of examples of mixtures suitable for the disclosure, mention may especially be made of the following mixtures:

from 50 to 90% by weight, preferably from 55 to 80% by weight, more preferably from 60 to 75% by weight of C$_n$ volatile linear alkane with n ranging from 7 to 14;

from 10 to 50% by weight, preferably from 20 to 45% by weight, preferably from 24 to 40% by weight of C$_{n+x}$ volatile linear alkane with x greater than or equal to 1, preferably x=1 or x=2, with n+x between 8 and 14, relative to the total weight of alkanes in said mixture.

In particular, said mixture of alkanes according to the disclosure contains:

less than 2% by weight, preferably less than 1% by weight, of branched hydrocarbons;

and/or less than 2% by weight, preferably less than 1% by weight, of aromatic hydrocarbons;

and/or less than 2% by weight, preferably less than 1% by weight and preferentially less than 0.1% by weight of unsaturated hydrocarbons in the mixture.

More particularly, a volatile linear alkane suitable for the disclosure may be used in the form of an n-undecane/n-tridecane mixture.

In particular, use will be made of a mixture of volatile linear alkanes comprising:

from 55 to 80% by weight, preferably from 60 to 75% by weight, of C$_{11}$ (n-undecane) volatile linear alkane;

from 20 to 45% by weight, preferably from 24 to 40% by weight, of C$_{13}$ (n-tridecane) volatile linear alkane relative to the total weight of alkanes in said mixture.

According to one particular embodiment, the mixture of alkanes is an n-undecane/n-tridecane mixture. In particular, such a mixture may be obtained according to Example 1 or Example 2 of WO 2008/155059.

According to another particular embodiment, use is made of the n-dodecane sold under the reference PARAFOL 12-97 by Sasol.

According to another particular embodiment, use is made of the n-tetradecane sold under the reference PARAFOL 14-97 by Sasol.

According to yet another embodiment, use is made of a mixture of n-dodecane and of n-tetradecane.

The composition of the disclosure may comprise from 5% to 50% by weight of volatile linear alkane(s), in particular from 5 to 40% by weight of volatile linear alkane(s), and more particularly from 5 to 30% of volatile linear alkane(s) relative to the total weight of the composition.

The volatile solvent is generally present in the composition of the instant disclosure in an amount ranging from about 0.001% to about 95% by weight; such as from about 1% to about 60% by weight; such as from about 3% to about 10% by weight, based on the total weight of the composition.

Emulsifier

The composition also contains at least one emulsifier. Suitable emulsifiers that can be used according to the instant disclosure include, but are not limited to, nonionic, cationic, anionic, and zwitterionic emulsifiers. Alternatively, suitable emulsifiers according to the instant disclosure include, but are not limited to, acyl lactylates, alkyl phosphates, carboxylic acid copolymers, esters and ethers of glucose, esters of glycerin, esters of, esters of sorbitan anhydrides, esters of sorbitol, ethoxylated ethers, ethoxylated alcohols, fatty acid amides, fatty acid esters of polyethylene glycol, fatty esters of polypropylene glycol, polyoxyethylene fatty ether phosphates, soaps, alkoxylated polydimethylsiloxanes, and mixtures thereof.

Preferably, the emulsifier is chosen from emulsifying crosslinked siloxane elastomers such as Dimethicone/PEG-10/15 Crosspolymer commercially available from the Shin-Etsu Company as KSG-210, Dimethicone/Polyglycerin-3 Crosspolymer commercially available from the Shin-Etsu Company as KSG 710, Lauryl PEG-15 Dimethicone/Vinyl Dimethicone Crosspolymer commercially available from the Shin-Etsu Company as KSG-31, PEG-12 Dimethicone Crosspolymer, commercially available from the Dow-Corning Company as DC 9011. In one embodiment, the compound useful as an emulsifier is Dimethicone/PEG-10/15 Crosspolymer. For examples of other suitable emulsifiers that can be used according to the instant disclosure, see, for example, McCutcheon's, Detergents and Emulsifiers, North American Edition (2003), Allured Publishing Corporation, the entire contents of which are hereby incorporated by reference.

The compositions according to the disclosure may be prepared according to techniques that are well known to those skilled in the art, in particular those intended for the preparation of emulsions of oil-in-water, water-in-oil, silicone-in-water and/or water-in-silicone type. They may be in particular in the form of a simple or complex emulsion (O/W, W/O, O/W/O, W/O/W and/or W/Si emulsions) such as a cream or a milk, in the form of a gel or a cream-gel, or in the form of a lotion, a powder or a solid tube, and may optionally be packaged as an aerosol and may be in the form of a mousse or a spray. These compositions are prepared according to the usual methods.

The compositions according to the disclosure are preferably in the form of a water-in-oil emulsion.

As emulsifying surfactants that may be used for the preparation of the W/O emulsions, examples that may be mentioned include Lauryl PEG/PPG-18/18 methicone and PEG-30 dipolyhydroxystearate, sorbitan, glycerol or sugar alkyl esters or ethers; silicone surfactants, for instance dimethicone copolyols, such as the mixture of cyclomethicone and of dimethicone copolyol, sold under the name "DC 5225 C" by the company Dow Corning, and alkyldimethicone copolyols such as laurylmethicone copolyol sold under the name "Dow Corning 5200 Formulation Aid" by the company Dow Corning; cetyldimethicone copolyol, such as the product sold under the name Abil EM 90R by the company Goldschmidt, and the mixture of cetyldimethicone copolyol, of polyglyceryl isostearate (4 mol) and of hexyl laurate, sold under the name Abil WE 09 by the company Goldschmidt. One or more co-emulsifiers may also be added thereto, which may be chosen advantageously from the group comprising polyol alkyl esters. Polyol alkyl esters that may especially be mentioned include glycerol and/or sorbitan esters, for example polyglyceryl isostearate, such as the product sold under the name Isolan GI 34 by the company Goldschmidt, sorbitan isostearate, such as the product sold under the name Arlacel 987 by the company ICI, sorbitan glyceryl isostearate, such as the product sold under the name Arlacel 986 by the company ICI, and mixtures thereof. In some embodiments, an emulsion stabilizer such as Poly C10-30 alkyl acrylate can also be used.

The emulsifier is generally present in the composition of the instant disclosure in an amount ranging from about 0.5% to about 15% by weight; such as from about 0.5% to about 10% by weight; such as from about 1% to about 8% by weight, based on the total weight of the composition.

Film Former

The water-in-oil composition according to the disclosure, may further include a film former. In some embodiments, suitable example of film formers includes, but are not limited to, Acrylates/dimethicone copolymer, Trimethylsiloxysilicate (and) polypropylsilsesquioxane, Acrylates/Polytrimethylsiloxymethacrylate Copolymer, Dimethicone (and) Acrylates/dimethicone copolymer, Polypropylsilsesquioxane, Trimethylsiloxysilicate), Crotonic acid/vinyl C8-12, Isoalkyl Esters/Va/Bis-Vinyldimethicone Crosspolymer and Carnauba Wax.

The at least one film former may be present in an amount from about 0.1%, 0.2% 0.25%, 0.3%, 0.35%, 0.4%, 0.5%, 0.6%, 0.7%, 0.8%, 0.9%, 1%, 1.5%, 2.0% to about 2%, 2.2, 2.4%, 2.5%, 2.6%, 2.8%, 3%, 3.5%, 4.0%, 4.5% or 5%.

Optional Ingredients

Tactile Modifier

The composition of the instant disclosure may also contain at least one tactile modifier. Suitable tactile modifiers include, but are not limited to nylon, silica, polymethylsilsesquioxane and mixtures thereof.

Pigments

The composition of the instant disclosure may also contain at least one pigment. Preferably, such colored compositions can be cosmetic compositions such as, for example, lip compositions (for example, lipstick or liquid lip colors or lip gloss), body tints, bronzers, self tanners, mascaras, eyeshadow, nail polish or foundations.

According to this embodiment, the at least one pigment is preferably chosen from dyes, such as liposoluble dyes, nacreous pigments, and pearling agents.

Representative liposoluble dyes which may be used according to the instant disclosure include Sudan Red, DC Red 17, DC Green 6, β-carotene, soybean oil, Sudan Brown, DC Yellow 11, DC Violet 2, DC Orange 5, annatto, and quinoline yellow. The liposoluble dyes, when present, generally have a concentration ranging up to 20% by weight of the total weight of the composition, such as from 0.0001% to 6%, including all ranges and sub-ranges there between.

The nacreous pigments which may be used according to the instant disclosure may be chosen from white nacreous pigments such as mica coated with titanium or with bismuth oxychloride, colored nacreous pigments such as titanium mica with iron oxides, titanium mica with ferric blue or chromium oxide, titanium mica with an organic pigment chosen from those mentioned above, and nacreous pigments based on bismuth oxychloride.

The pigments, which may be used according to the instant disclosure, may be chosen from white, colored, inorganic, organic, polymeric, nonpolymeric, coated and uncoated pigments. Representative examples of mineral pigments include titanium dioxide, optionally surface-treated, zirconium oxide, zinc oxide, cerium oxide, iron oxides, chromium oxides, manganese violet, ultramarine blue, chromium hydrate, and ferric blue. Representative examples of organic pigments include carbon black, pigments of D & C type, and lakes based on cochineal carmine, barium, strontium, calcium, and aluminum.

If present the pigment is generally present in the composition of the instant disclosure in an amount ranging from about 0% to about 15% by weight; such as from about 0.010% to about 10% by weight; such as from about 0.10% to about 5% by weight, all weights being based on the weight of the composition as a whole.

Active Agents

The composition of the instant disclosure may also contain at least one active agent capable of imparting a benefit onto skin. It is to be understood that the active agents useful herein can in some instances provide more than one benefit or operate via more than one mode of action. Therefore, classifications herein are made for the sake of convenience and are not intended to limit the active to that particular application or applications listed.

For example, the compositions of the instant disclosure may contain a safe and therapeutically effective amount of one or more pharmaceutically or cosmetically acceptable anti-acne active agents. Suitable anti-acne actives include, but are not limited to, resorcinol; sulfur; salicylic acid and salicylates; alpha-hydroxy acids; nonsteroidal anti-inflammatory agents; benzoyl peroxide; retinoic acid, isoretinoic acid and other retinoid compounds; adapalene; tazarotene; azelaic acid and azelaic acid derivatives; antibiotic agents, such as erythromycin and clyndamycin; zinc salts and complexes; and mixtures thereof.

For example, the compositions of the instant disclosure may contain a safe and effective amount of one or more anti-wrinkle active agents. Suitable anti-wrinkle active agents for use in the compositions of the instant disclosure include, but are not limited to, sulfur-containing D and L amino acids and their derivatives and salts, particularly the N-acetyl derivatives; thiols; hydroxy acids (e.g., alpha-hydroxy acids such as lactic acid and glycolic acid and their derivatives and salts; or beta-hydroxy acids such as salicylic acid and salicylic acid salts and derivatives), urea, hyaluronic acid, phytic acid, lipoic acid; lysophosphatidic acid, skin peel agents (e.g., phenol, resorcinol and the like), vitamin B3 compounds (e.g., niacinamide, nicotinic acid and nicotinic acid salts and esters, including non-vasodilating esters of nicotinic acid (such as tocopheryl nicotinate), nicotinyl amino acids, nicotinyl alcohol esters of carboxylic acids, nicotinic acid N-oxide and niacinamide N-oxide), vitamin B5 and retinoids (e.g., retinol, retinal, retinoic acid, retinyl acetate, retinyl palmitate, retinyl ascorbate).

The compositions of the instant disclosure may contain a safe and effective amount of one or more anti-oxidant/radical scavengers. Suitable anti-oxidants/radical scavengers include, but are not limited to, ascorbic acid (vitamin C) and its salts; ascorbyl esters of fatty acids; ascorbic acid derivatives (e.g., magnesium ascorbyl phosphate, sodium ascorbyl phosphate, ascorbyl sorbate); tocopherol (vitamin E); tocopherol sorbate; tocopherol acetate; other esters of tocopherol; butylated hydroxy benzoic acids and their salts; 6-hydroxy-2,5,7,8-tetramethylchroman-2-carboxylic acid (commercially available under the tradename Trolox©); gallic acid and its alkyl esters, especially propyl gallate; uric acid and its salts and alkyl esters; sorbic acid and its salts; lipoic acid; amines (e.g., N,N-diethylhydroxylamine, amino-guanidine); sulfhydryl compounds (e.g., glutathione); dihydroxy fumaric acid and its salts; lysine pidolate; arginine pidolate; nordihydroguaiaretic acid; bioflavonoids; curcumin; lysine; methionine; proline; superoxide dismutase; silymarin; tea extracts; grape skin/seed extracts; melanin; rosemary extracts; artemia extract; diethylhexyl syringylidene malonate (such as that sold under the trade name Oxynex ST by Merck); *Senna alata*; and their mixtures.

Among the active agents that may be mentioned are:
antipollution agents and/or free-radical scavengers;
depigmenting agents and/or propigmenting agents;
antiglycation agents;
NO-synthase inhibitors;
agents for stimulating the synthesis of dermal or epidermal macromolecules and/or for preventing their degradation;
agents for stimulating fibroblast proliferation;
agents for stimulating keratinocyte proliferation;
muscle relaxants;
tensioning agents;
desquamating agents;
moisturizers;
anti-inflammatory agents;
agents acting on the energy metabolism of cells;
insect repellants;
substance P or CGRP antagonists.

Emollients

The composition of the instant disclosure may contain emollients. Suitable emollients include, but are not limited to, mineral oil; petrolatum; $C_7$-$C_{40}$ branched chain hydrocarbons; $C_1$-$C_{30}$ alcohol esters of $C_1$-$C_{30}$ carboxylic acids; $C_1$-$C_{30}$ alcohol esters of $C_2$-$C_{30}$ dicarboxylic acids; monoglycerides of $C_1$-$C_{30}$ carboxylic acids; diglycerides of $C_1$-$C_{30}$ carboxylic acids; triglycerides of $C_1$-$C_{30}$ carboxylic acids; ethylene glycol monoesters of $C_1$-$C_{30}$ carboxylic acids; ethylene glycol diesters Of $C_1$-$C_{30}$ carboxylic acids; propylene glycol monoesters Of $C_1$-$C_{30}$ carboxylic acids; propylene glycol diesters of $C_1$-$C_{30}$ carboxylic acids; $C_1$-$C_{30}$ carboxylic acid monoesters and polyesters of sugars, for example, sefa cottonate (sucrose polycottonseedate); polydialkylsiloxanes; polydiarylsiloxanes; polyalkarylsiloxanes; cyclomethicones having 3 to 9 silicon atoms; vegetable oils; hydrogenated vegetable oils; polypropylene glycol $C_4$-$C_{20}$ alkyl ethers; di $C_5$-$C_{30}$ alkyl ethers; and mixtures thereof.

Self-Tanning Active Agents

The composition of the instant disclosure may also contain a self-tanning active agent. Suitable self tanning agents include, but are not limited to, monocarbonyl or polycarbonyl compounds, such as isatin, alloxan, ninhydrin, glyceraldehyde, mesotartaric aldehyde, glutaraldehyde, erythrulose and dihydroxyacetone (DHA).

Skin Lightening/Whitening Agents

The composition of the instant disclosure may contain a skin lightening/whitening agent. Suitable skin lightening/whitening agents include, but are not limited to, hydroquinone; azelaic acid and other related dicarboxylic acids, and salts and derivatives thereof; retinoids; kojic acid; arbutin; nicotinic acid and its precursors, salts and derivatives; arbutin; ascorbic acid and salts and derivatives thereof (e.g., magnesium ascorbyl phosphate or sodium ascorbyl phosphate); herbal extracts (e.g., licorice extract, mulberry extract); and mixtures thereof.

Thickeners

Hydrophilic thickeners that may be mentioned include carboxyvinyl polymers such as the Carbopol products (carbomers) and the Pemulen products (acrylate/C10-C30-alkylacrylate copolymer); polyacrylamides, for instance the crosslinked copolymers sold under the names Sepigel 305 (CTFA name: polyacrylamide/C13-14 isoparaffin/Laureth 7) or Simulgel 600 (CTFA name: acrylamide/sodium acryloyldimethyltaurate copolymer/isohexadecane/polysorbate 80) by the company SEPPIC; 2-acrylamido-2-methylpropanesulfonic acid polymers and copolymers, which are optionally crosslinked and/or neutralized, for instance the poly(2-acrylamido-2-methylpropanesulfonic acid) sold by the company Hoechst under the trade name "Hostacerin AMPS" (CTFA name: ammonium polyacryldimethyltauramide); cellulose-based derivatives such as hydroxyethylcellulose; polysaccharides and especially gums such as xanthan gum; and mixtures thereof.

Needless to say, a person skilled in the art will take care to select the optional additional compound(s) mentioned above and/or the amounts thereof such that the advantageous properties intrinsically associated with the compositions in accordance with the disclosure are not, or are not substantially, adversely affected by the envisaged addition(s).

The compositions according to the disclosure find their application in a large number of treatments, especially cosmetic treatments, of the skin, the lips and the hair, including the scalp, especially for protecting and/or caring for the skin, the lips and/or the hair, and/or for making up the skin and/or the lips.

The instant disclosure will be better understood from the examples that follow, all of which are intended for illustrative purposes only and are not meant to unduly limit the scope of the disclosure in any way.

The compositions and methods of the instant disclosure can comprise, consist of, or consist essentially of the essential elements and limitations of the disclosure described herein, as well as any additional or optional ingredients, components, or limitations described herein or otherwise useful.

All percentages, parts and ratios herein are based upon the total weight of the compositions of the instant disclosure, unless otherwise indicated.

All ranges and values disclosed herein are inclusive and combinable. For examples, any value or point described herein that falls within a range described herein can serve as a minimum or maximum value to derive a sub-range, etc. Furthermore, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

Other than in the operating examples, or where otherwise indicated, all numbers expressing quantities of ingredients and/or reaction conditions are to be understood as being modified in all instances by the term "about," meaning within +/−5% of the indicated number.

As used herein, the expression "at least one" is interchangeable with the expression "one or more" and thus includes individual components as well as mixtures/combinations.

The term "active material" as used herein with respect to the percent amount of an ingredient or raw material, refers to 100% activity of the ingredient or raw material.

"Cosmetically acceptable" means that the item in question is compatible with a keratinous substrate such as skin and hair. For example, a "cosmetically acceptable carrier" means a carrier that is compatible with a keratinous substrate such as skin and hair.

The term, "a mixture thereof", "mixtures thereof", or "combinations thereof" does not require that the mixture include all of A, B, C, D, E, and F (although all of A, B, C, D, E, and F may be included). Rather, it indicates that a mixture of any two or more of A, B, C, D, E, and F can be included. In other words, it is equivalent to the phrase "one or more elements selected from the group consisting of A, B, C, D, E, F, and a mixture of any two or more of A, B, C, D, E, and F."

Likewise, the term "a salt thereof" also relates to "salts thereof." Thus, where the disclosure refers to "an element selected from the group consisting of A, B, C, D, E, F, a salt thereof, and a mixture thereof," it indicates that that one or more of A, B, C, D, and F may be included, one or more of a salt of A, a salt of B, a salt of C, a salt of D, a salt of E, and a salt of F may be included, or a mixture of any two of A, B, C, D, E, F, a salt of A, a salt of B, a salt of C, a salt of D, a salt of E, and a salt of F may be included.

The salts referred to throughout the disclosure may include salts having a counter-ion such as an alkali metal, alkaline earth metal, or ammonium counter-ion. This list of counter-ions, however, is non-limiting.

The term "INCI" is an abbreviation of International Nomenclature of Cosmetic Ingredients, which is a system of names provided by the International Nomenclature Committee of the Personal Care Products Council to describe personal care ingredients.

The term "weight ratio" or "mass ratio" as used herein, references the amount of a substance in proportion to a mixture containing said substance, and is calculated by dividing the amount of said substance by weight contained in the mixture by the weight of the mixture containing said substance. As an example, a weight ratio of 0.4 for substance A in a mixture of A, B, and C indicates that the weight of substance A divided by the total weight of substances A, B, and C is 0.4.

As used herein, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

Some of the various categories of components identified may overlap. In such cases where overlap may exist and the composition includes both components (or the composition includes more than two components that overlap), an overlapping compound does not represent more than one component. For example, a fatty acid may be characterized as both a nonionic surfactant and a fatty compound. If a particular composition includes both a nonionic surfactant and a fatty compound, a single fatty acid will serve as only the nonionic surfactant or as only the fatty compound (the single fatty acid does not serve as both the nonionic surfactant and the fatty compound).

All publications and patent applications cited in this specification are herein incorporated by reference, and for any and all purposes, as if each individual publication or patent application were specifically and individually indicated to be incorporated by reference. In the event of an inconsistency between the instant disclosure and any publications or patent application incorporated herein by reference, the instant disclosure controls.

EXAMPLES

Example 1

Inventive Example

The following Examples are provided for illustrative purposes only, and are not intended to be limiting. Unless otherwise indicated, all parts and percentages are on a weight-by-weight percentage basis.

The inventive formula was prepared as follows. The oil phase including the organic sunscreen actives was mixed while heating in the main kettle. Once it reached 75° C. and was homogeneous, the oil phase was cooled to <66° C., and the remaining heat-sensitive oil-based ingredients were added to the main kettle. Once homogeneous, the oil phase was cooled to <50° C. and tactile modifiers were added to the main kettle. In a side kettle, the water phase was mixed and heated to 70° C. Once <50° C., the water phase was added to the oil phase in the main kettle under moderate homogenization and cooling was initiated. Once <30° C., the activated clay and other volatile solvents were added to the main kettle. The batch was dropped at once it reached room temperature and specifications were measured.

TABLE 3

Inventive Example 1: water-in-oil sunscreen composition

| Function | INCI Name | Inventive Example 1 Concentration, wt. % |
|---|---|---|
| Clay | Disteardimonium hectorite | 0.1 |
| Activating agent | Propylene carbonate | 0.03 |
| Dispersing agent | Silica | 5 |
| Organic sunscreen active | Butyl methoxydibenzoylmethane | 3 |
| Organic sunscreen active | Ethylhexyl salicylate | 5 |
| Organic sunscreen active | Octocrylene | 10 |
| Organic sunscreen active | Homosalate | 15 |
| Non-volatile solvent | Dicaprylyl ether; C15-19 alkane | 11 |
| Volatile solvent | Alcohol; Isohexadecane | 7.87 |
| Emulsifier | Lauryl PEG/PPG-18/18 methicone; PEG-30 dipolyhydroxystearate; Poly C10-30 alkyl acrylate | 3.62 |
| Film former | Acrylates/dimethicone copolymer | 2.5 |
| Tactile modifier | Polymethylsilsesquioxane | 3 |
| Emollient | Dicaprylyl carbonate | 1 |
| pH adjuster | pH adjuster | 0.1 |
| Preservative | Preservative | 1.6 |
| Salt | Salt | 0.5 |
| Silicone | Silicone | 2.5 |
| SPF booster | SPF booster | 5 |
| Vitamin | Vitamin | 0.5 |
| Water | Water | Q.S. |

Example 2

Comparative Examples

The following formulas were prepared as described above.

TABLE 4

Comparative Examples:

| Function | INCI | Comparative Example 1 wt. % | Comparative Example 2 wt. % | Comparative Example 3 wt. % |
|---|---|---|---|---|
| Clay | Disteardimonium hectorite | 0 | 0.1 | 0 |
| Activating agent | Propylene carbonate | 0 | 0.03 | 0 |
| Dispersing agent | Aluminum Stearate (and) Alumina (and) Polyhydroxystearic Acid | 0 | 6.96 | 0 |
| Organic sunscreen active | Butyl methoxydibenzoylmethane | 3 | 0 | 3 |
| Organic sunscreen active | Octocrylene | 10 | 0 | 10 |
| Organic sunscreen active | Ethylhexyl salicylate | 5 | 0 | 5 |
| Organic sunscreen active | Homosalate | 13 | 0 | 13 |

TABLE 4-continued

Comparative Examples:

| Function | INCI | Comparative Example 1 wt. % | Comparative Example 2 wt. % | Comparative Example 3 wt. % |
|---|---|---|---|---|
| Non-volatile solvent | Non-volatile solvent | 3 | 20.58 | 11 |
| Volatile solvent | Volatile solvent | 1 | 13.08 | 6.6 |
| Emulsifier | Emulsifier | 2.3 | 2.25 | 4 |
| Film former | Film former | 3.2 | 2.5 | 0 |
| Tactile modifier | Tactile modifier | 5 | 5.5 | 3 |
| Emollient | Emollient | 3 | 2 | 1 |
| pH adjuster | pH adjuster | 0.35 | 0 | 0.1 |
| Preservative | Preservative | 2.2 | 1.08 | 1.3 |
| Salt | Salt | 0.5 | 0.5 | 0.5 |
| Silicone | Silicone | 4.3 | 5.75 | 2.5 |
| SPF booster | SPF booster | 5 | 3.1 | 5 |
| Vitamin | Vitamin | 2 | 0.5 | 0 |
| Thickener | Thickener | 0.1 | 0 | 0 |
| Emulsion stabilizer | Emulsion stabilizer | 2.3 | 0 | 0 |
| Filler | Filler | 0 | 0.2 | 0 |
| Mineral sunscreen active | Zinc oxide | 0 | 8 | 0 |
| Mineral sunscreen active | Titanium dioxide | 0 | 17 | 0 |
| Water (QS) | | Q.S. | Q.S. | Q.S. |

Example 3

Properties Evaluation

Viscosity Measurement

Formula apparent viscosity was measured using a Maple Instruments Rheomat RMI 180 Viscometer. Smaller spindles were used to measure apparent viscosity of thicker formulas (M4) while larger spindles (M2) were used to measure apparent viscosity of more fluid formulas. Apparent viscosity was reported in uD and ranges from 20-80, with 20 indicating a thinner formula and 80 indicating a thicker formula. The apparent viscosity of the Inventive Example 1 was 32 uD measured using an M2 spindle. The apparent viscosities of Comparative Example 1 (lotion consistency) and Comparative Example 2 were 25 (M4) and 37 (M2), respectively. Thus, the apparent viscosities of the Inventive Example 1 and Comparative Example 2 were comparable whereas the Inventive Example 1 was significantly more fluid than Comparative Example 1. See Table 5.

Sensory Assessment

Formula aspect was assessed visually and formula sensory was assessed by applying the formula to the skin. A number of subjects tried the formula to provide sensory feedback. The Inventive Example was a light fluid. It was soft, silky, and highly spreadable. It leaved a non-greasy residue and was non-whitening. Comparative Example 1 had a lotion consistency. It was soft and velvety, giving a non-greasy and non-whitening residue. Comparative Example 2 was a light fluid. It was soft, silky, and highly spreadable, but it was more greasy and more whitening than the Inventive Example. See Table 5.

In Vitro SPF and Absorbance

The compositions in the table below were prepared as described above.

In vitro SPF and absorbance versus wavelength in the UV light range were measured using a Labsphere UV-2000S in vitro sunscreen analyzer. 0.03 g of each formula was manually applied to each of 3 PMMA Helioplate PMMA molded (HD6) plates. Absorbance data was collected using an ISO 24443 method at 9 different locations across each plate, and was used to calculate in vitro SPF using Labsphere software.

Figure 1:
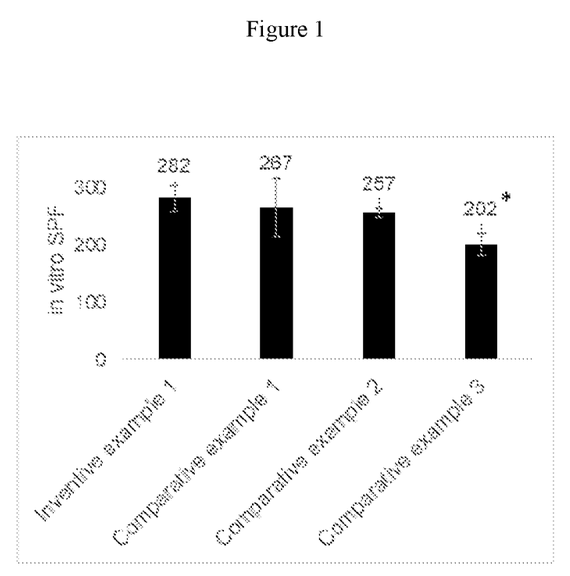
FIG. 1 is a bar graph evidencing the photo protection efficacy of a composition in accordance with the instant disclosure versus comparative compositions.
Figure 2:
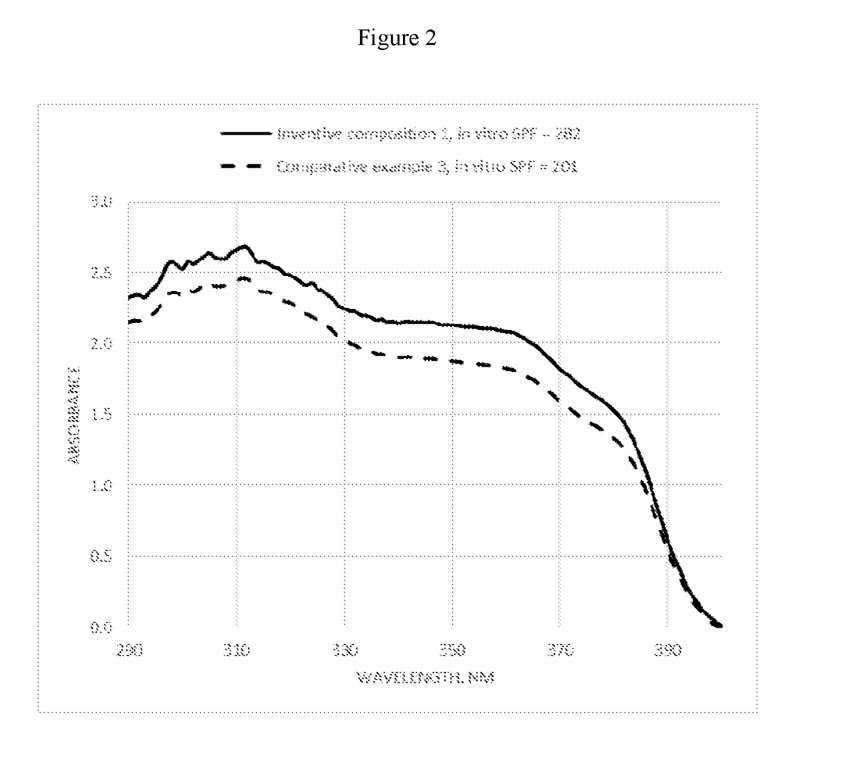
FIG. 2 is a graph evidencing the Absorbance versus the wavelength of a composition in accordance with the instant disclosure versus a comparative composition.

The average in vitro SPF value of the Inventive Example was significantly higher than that of Comparative Example 3 (FIG. 1; $p<0.05$). This was explained because the Inventive Example provided a better distribution of UV filters due to the presence of the activated clay+dispersing agent. The plot of absorbance versus wavelength in the UV light range showed better absorption across the UV light range for the Inventive Example than Comparative Example 3 (FIG. 2), also supporting that the Inventive Example 1 gave a better sun protection factor. Indeed, the Inventive Example provided an even distribution of sunscreen filters which reinforced its sun protection factor. This was evidenced by comparing in vitro SPF values as well as the absorbance vs. wavelength in the UV light region profile for the Inventive Example and Comparative Example 3 which had the same composition as the Inventive Example but without the activated clay+dispersing agent.

The results were reported in Table 6 below.

TABLE 6

In Vitro SPF values

| | Inventive Example 1 | Comparative Example 3 | Comparative Example 1 | Comparative Example 2 |
|---|---|---|---|---|
| Structure | W/O emulsion | W/O emulsion | O/W emulsion | W/O emulsion |
| Activated clay + dispersant, Y/N | Y | N | N | Y |
| UV filters | Organic | Organic | Organic | Mineral |
| In vitro SPF | 282 | 202 | 267 | 257 |

In Vivo SPF and Water Resistance

Static and water resistant SPF were measured in vivo following FDA 2011 methods. The minimal erythema dose was determined on the backs of 5-10 subjects with and without product to calculate SPF before and after water immersion. The static and water resistant SPF of the inventive formula are 60 and 60 (water resistance=80 minutes). These SPF values were higher than those of Comparative Example 2 which had a similar formula composition but used mineral sunscreen filters instead of organic sunscreen filters (47 and 49 (water resistance=40 minutes)).

The results were reported in Table 5 below.

TABLE 5

|  | Inventive Example 1 | Comparative Example 1 | Comparative Example 2 | Comparative Example 3 |
|---|---|---|---|---|
| Structure | W/O emulsion | O/W emulsion | W/O emulsion | W/O emulsion |
| Activated clay + dispersant, Y/N | Y | N | Y | N |
| Viscosity, uD | 32 (M2) | 25 (M4) | 37 (M2) | N/A |
| Aspect + Sensory | Light fluid; Soft, silky, spreadable; Non-greasy | Lotion; Soft, velvety; Non-greasy | Light fluid; Soft, silky, spreadable; Non-greasy |  |
| Whitening | None | None | Moderate | None |
| In vivo SPF, static | 60 | 83 | 47 | N/A |
| In vivo SPF, water resistance (N = 5-10) | 60 (WR 80 min) | 72 (WR 80 min) | 49 (WR 40 min) | N/A |
| N = number of subject | N = 5 | N = 10 | N = 5 | N/A |

The results showed unexpected results regarding in vivo SPF, water resistance, and even UV filter distribution using organic sunscreen actives of the Inventive Example. The Inventive Example provided a unique sensory experience to the subject, no whitening, a high in vivo SPF of 60 and a water resistance of 80 minutes.

The in vitro SPF values of Inventive Example 1 were unexpectedly and significantly improved compared to Comparative Example 3 that didn't contain any Activated clay+dispersant.

The SPF values as well as the water resistance were unexpectedly and significantly improved compared to Comparative Example 2 that did contain Activated clay+dispersant but did contain Mineral UV filters.

What is claimed is:

1. A water-in-oil sunscreen composition comprising:
   (a) at least one oil phase thickening agent chosen from an activated clay;
   (b) at least one substantially solid form dispersing aid;
   (c) at least one organic sunscreen active;
   (d) at least one non-volatile solvent;
   (e) at least one volatile solvent;
   (f) at least one emulsifier;
   (g) at least one film former; and
   (h) water,
   wherein (a) and (b) are present in the composition in a ratio by weight ranging from greater than 1:10 to less than 1:4;
   wherein (b) and (c) are present in the composition in a ratio by weight ranging from greater than 1:30 to less than 1:1; and
   wherein the water-in-oil sunscreen composition is free of inorganic UV filters.

2. The composition of claim 1, wherein (a) is chosen from Disteardimonnium hectorite, Stearalkonium hectorite, Quat-18 bentonite, Quat-18 hectorite, Benzalkonium bentonite, bentonite clay, hectorite clay, and montmorillonite clay.

3. The composition of claim 1, wherein (a) is a disteardimonium hectorite clay modified by propylene carbonate.

4. The composition of claim 1, wherein (a) is present in an amount of from about 0.01% to about 7.5% by weight, based on the total weight of the composition.

5. The composition of claim 1, wherein (a) is present in an amount of from about 0.1% to about 1.25% by weight, based on the total weight of the composition.

6. The composition of claim 1, wherein (b) is chosen from silica, Silica and TiO2 sol/gel particles, starch, precipitated calcium carbonate, hydroxyapatite, montmorillonite, lauroyl lysine, mica, sericite, talc, polytetrafluoroethylene (PTFE wax), boron nitride, kaolin, calcium sulfate, pumice, bismuth oxychloride, aluminum oxide, silicon, perlite, oxychloride bismuth, barium sulfate, glass particles, mica and TiO2 particles, barium sulfate, and synthetic mica.

7. The composition of claim 1, wherein (b) is silica.

8. The composition of claim 1, wherein (b) is present in an amount of from about 0.1% to about 30% by weight, based on the total weight of the composition.

9. The composition of claim 1, wherein (c) is chosen from organic sunscreen actives and mixtures thereof.

10. The composition of claim 1, wherein (c) is present in an amount of from about 10% to about 50% by weight, based on the total weight of the composition.

11. The composition of claim 1, wherein (d) is chosen from a silicon oil functionalized or non-functionalized, a hydrocarbon oil and a mixtures thereof.

12. The composition of claim 1, wherein (d) is present in an amount of from about 1% to about 50% by weight, based on the total weight of the composition.

13. The composition of claim 1, wherein (e) is chosen from alcohol, isohexadecane, mineral oil, petroleum distillates, Castor oil, lanolin oil, isopropyl palmitate, isopropyl myristate, C12-15 alkyl benzoate, Propylene glycol dicaprylate, cyclomethicone, dimethicone and mixtures thereof.

14. The composition of claim 1, wherein (e) is present in an amount of from about 0% to about 95% by weight, based on the total weight of the composition.

15. The composition of claim 1, wherein (f) is present in an amount of from about 0.5% to about 15% by weight, based on the total weight of the composition.

16. The composition of claim 1, wherein (g) is chosen from the group consisted of acrylates/dimethicone crosspolymer, Trimethylsiloxysilicate (and) polypropylsilsesquioxane, Acrylates/Polytrimethylsiloxymethacrylate Copolymer, Dimethicone (and) Acrylates/dimethicone copolymer, Polypropylsilsesquioxane, Trimethylsiloxysilicate), Carnauba Wax and a mixture thereof.

17. The composition of claim 1, wherein (g) is present in an amount from about 0.1% to about 5% by weight, based on the total weight of the composition.

18. The composition of claim 1 wherein (a) and (b) are present in the composition in a ratio by weight ranging from greater than or equal to 1:5 up to less than or equal to 1:9.

19. A water-in-oil sunscreen composition comprising:
 (a) from about 0.1% to about 1.25% by weight of at least one oil phase thickening agent chosen from an activated clay selected from the group consisting of disteardimonium hectorite, stearalkonium hectorite, quaternium-18 bentonite, quaternium-18 hectorite, and benzalkonium bentonite;
 (b) from about 1% to about 5% by weight of at least one substantially solid form dispersing aid comprising silica;
 (c) from about 20% to about 40% by weight of at least one organic sunscreen active;
 (d) from about 5% to about 30% by weight of at least one non-volatile solvent;
 (e) from about 3% to about 10% by weight of at least one volatile solvent;
 (f) from about 1% to about 8% by weight of at least one emulsifier; and
 (g) water,
 wherein the weights of (a)-(g) are based on the total weight of the composition; and
 wherein (a) and (b) are present in the composition in a ratio by weight ranging from greater than 1:10 to less than 1:4;
 wherein (b) and (c) are present in the composition in a ratio by weight ranging from greater than 1:30 to less than 1:1; and
 wherein the water-in-oil sunscreen composition is free of inorganic UV filters.

20. A method for protecting a keratinous substrate from UV rays by topically applying onto the substrate a water-in-oil sunscreen composition containing:
 (a) at least one oil phase thickening agent chosen from an activated clay;
 (b) at least one substantially solid form dispersing aid;
 (c) at least one organic sunscreen active;
 (d) at least one non-volatile solvent;
 (e) at least one volatile solvent;
 (f) at least one emulsifier;
 (g) at least one film former; and
 (h) water,
 wherein (a) and (b) are present in the composition in a ratio by weight ranging from greater than 1:10 to less than 1:4;
 wherein (b) and (c) are present in the composition in a ratio by weight ranging from greater than 1:30 to less than 1:1; and
 wherein the water-in-oil sunscreen composition is free of inorganic UV filters.

\* \* \* \* \*